United States Patent [19]

Brady et al.

[11] Patent Number: 5,642,297

[45] Date of Patent: Jun. 24, 1997

[54] APPARATUS AND METHOD FOR MEASURING THE KINEMATIC ACCURACY IN MACHINES AND MECHANISMS USING ABSOLUTE ENCODERS

[75] Inventors: O. Patrick Brady, Loudonville; Clyde J. Hindes, West Sand Lake; Boris I. Mintseris, Latham, all of N.Y.; Alexander S. Tseytlin, 32261 Willoughby Rd., Apt. 7, Farmington Hills, Mich. 48334

[73] Assignees: Gurley Precision Instruments, Inc., Troy, N.Y.; Alexander S. Tseytlin, Farmington Hills, Mich.

[21] Appl. No.: 324,718

[22] Filed: Dec. 12, 1994

[51] Int. Cl.⁶ .................................................. G01M 13/02
[52] U.S. Cl. ............... 364/559; 33/501.13; 250/231.15; 250/231.18; 364/474.17; 364/507; 73/162
[58] Field of Search ..................... 341/1, 2, 6, 9, 341/11, 13; 377/17; 364/559, 560, 167.01, 173, 174, 474.14, 474.15, 474.16, 474.35, 474.17; 33/1 PT, 501.7, 501.13; 250/231.14, 231.15, 231.16, 231.17, 231.18; 73/653, 162, 660, 862.06; 318/630; 356/375

[56] References Cited

U.S. PATENT DOCUMENTS

| | | | |
|---|---|---|---|
| 2,557,219 | 6/1951 | Flint et al. | 177/351 |
| 3,307,172 | 2/1967 | Kolb | 340/347 |
| 3,360,660 | 12/1967 | Kusch et al. | 250/237 |
| 3,669,549 | 6/1972 | Besson et al. | 356/152 |
| 3,851,398 | 12/1974 | Hilburger | 33/179.5 B |
| 4,093,146 | 6/1978 | Haley | 242/158.2 |
| 4,172,994 | 10/1979 | Bergkvist | 324/175 |
| 4,183,014 | 1/1980 | McClean et al. | 340/204 |
| 4,336,711 | 6/1982 | Maehara et al. | 73/162 |
| 4,355,902 | 10/1982 | Feist | 356/375 |
| 4,422,065 | 12/1983 | Radomirov et al. | 340/347 P |
| 4,488,359 | 12/1984 | Misson | 33/179.5 C |
| 4,499,760 | 2/1985 | Fischer et al. | 73/159 |
| 4,530,155 | 7/1985 | Burkhardt et al. | 33/1 L |
| 4,549,260 | 10/1985 | Saito et al. | 364/143 |
| 4,559,447 | 12/1985 | Schlotter et al. | 250/231 SE |
| 4,562,577 | 12/1985 | Glover et al. | 371/38 |
| 4,572,951 | 2/1986 | Toda et al. | 250/231 SE |
| 4,678,329 | 7/1987 | Lukowski, Jr. et al. | |
| 4,704,799 | 11/1987 | Kobetsky | 33/179.5 R |
| 4,730,110 | 3/1988 | Spaulding | 250/231 SE |
| 4,740,690 | 4/1988 | Mosier | 250/231 SE |
| 4,795,955 | 1/1989 | Yamashita | 318/632 |
| 4,831,872 | 5/1989 | Huang et al. | 73/162 |
| 4,889,997 | 12/1989 | Tomiolo | 250/561 |
| 5,018,844 | 5/1991 | Horton | 350/486 |
| 5,085,509 | 2/1992 | Gaffard et al. | 356/153 |
| 5,091,643 | 2/1992 | Okutani et al. | 250/231.14 |
| 5,128,536 | 7/1992 | Higashi | 250/231.16 |

(List continued on next page.)

*Primary Examiner*—Emanuel T. Voeltz
*Assistant Examiner*—Tony M. Cole
*Attorney, Agent, or Firm*—Heslin & Rothenberg, P.C.

[57] ABSTRACT

A system for measuring the accuracy of a machines and mechanisms having a driving member and a driven member is disclosed. The absolute position of the driving member is determined using a first absolute encoder operatively engaged to the driving member. The actual absolute position of the driven member is also determined using a second absolute encoder operatively engaged to the driven member. The theoretical absolute position of the driven member is then calculated based upon the absolute position of the driving member. The actual absolute position of the driven member is compared to the theoretical absolute position of the driven member, preferably by subtraction, to determine the accuracy of the machines and mechanisms. Optical absolute encoders may be used and the process may be performed using a microprocessor which may utilize a ratio function to calculate the theoretical absolute position of the driven member based upon the absolute position of a driving member. The ratio function may be a mathematical representation of the theoretical position of the driven member based upon the absolute position of the driving member. Using this system, kinematic accuracy or error may be determined in both the static and dynamic modes.

31 Claims, 4 Drawing Sheets

U.S. PATENT DOCUMENTS

| | | | |
|---|---|---|---|
| 5,148,377 | 9/1992 | McDonald | 364/560 |
| 5,252,838 | 10/1993 | Timblin | 250/561 |
| 5,258,931 | 11/1993 | Hassler, Jr. | 364/571.07 |
| 5,278,635 | 1/1994 | Ono et al. | 356/430 |
| 5,279,038 | 1/1994 | Lhenry | 33/1 N |
| 5,280,309 | 1/1994 | Zinsmeyer et al. | 346/139 R |
| 5,305,227 | 4/1994 | Sasaki et al. | 364/474.35 |
| 5,438,330 | 8/1995 | Yamazaki et al. | 341/11 |
| 5,465,624 | 11/1995 | Tseyltin et al. | 73/653 |

APPARATUS AND METHOD FOR MEASURING THE KINEMATIC ACCURACY IN MACHINES AND MECHANISMS USING ABSOLUTE ENCODERS

TECHNICAL FIELD

This invention relates to the area of checking the accuracy of members within machines and mechanisms. More particularly, this invention relates to an apparatus and method for measuring the accuracy of machines and mechanisms in static, kinetic and dynamic modes using absolute encoders.

BACKGROUND ART

Errors in machines and mechanisms such as gear pairs and trains, leading screw pairs, racks and pinions, etc. may be caused by continuous deviations of a driven member from its theoretically correct positions. In other words, the actual position of the driven member may not correspond to the theoretical position of the driven member which is powered by a driving member. Such errors may constitute the main source of vibrations and noise in machines, a loss of efficiency and may lead to other hazardous consequences that should be avoided. In order to improve a machine's design and production, it may be necessary to examine its kinematic accuracy or error to determine which elements of the machine are defective. In gear pairs for example, kinematic accuracy or error may range from ArcSeconds to hundreds of ArcSeconds. Such small deviations are very difficult to determine with accuracy, and devices for checking kinematic accuracy or error are generally incapable of measuring such small deviations because of their lack of precision. Until the beginning of the 1960's, the angle measurements of kinematic accuracy or error were typically performed by optical geodesic devices. Geodesic devices, however, have only limited resolution.

Incremental encoders are now typically used as an alternative to manual manipulated optic-geodesic devices for measuring kinematic accuracy or error in machines and mechanisms. One incremental encoder is typically mounted on a driving element while another is mounted on a driven element. The outputs of both incremental encoders are connected to a phase meter through proper frequency dividers. The incremental encoders operate by fractioning measuring coordinates on multiple index intervals on a uniform scale or raster, such as, for example, an optical, magnetic, mechanical or any other angular scale, attached to the driving and driven elements of a machine or mechanism. A principle on which the prior incremental measurement method is based, is fractioning of measuring coordinates on multiple index intervals in the form of a uniform raster-type scale.

One problem with incremental measurement is the elimination of background carrying signal that is generated by the grades or intervals. In the beginning of every measurement cycle, the deviation between the actual position and theoretical position of a rotary member is negligible. At the beginning of this measurement cycle, any such deviation represents the kinematic accuracy or error. At the next measurement cycle, the deviation will be transferred to the next interval. By using incremental encoders to obtain a discrete representation of the rotation of a gear, the discrete seria in the form of a periodic function may be transformed in the continuous form by integration. Measurement of the phase difference between two discrete signals received from two incremental encoders, which are attached to the driving and driven members (elements) of a machine or mechanism and balanced to the same frequency by frequency dividers, may then be obtained.

The degree of approximation will depend on the number of indexes that are involved in the measurements. The greater the number of intervals the better the approximation to the real function of kinematic accuracy or error. The number of grades of the scale (or the number of pulses on the output of the interface-interpolator) has only technological performance limits. The transfer of the deviation in a rotary member's position for a previous cycle to a subsequent cycle requires the encoder to run constantly. The measurement of kinematic accuracy or error for multiple rotation cycles will be impossible if a machine is not running because the continuous process of coordinate transference will be interrupted and accumulated information will be lost. For this reason, accurate measurement of quasi static or static parameters of accuracy is impossible for devices based using frequency dividers and phasemeter-traditional measuring schemes incorporating incremental encoders. Another problem associated with using incremental encoders to measure kinematic accuracy or error is the level of approximation of a real function of kinematic accuracy or error by its discrete image. According to information theory, this approximation is different for each harmonic component. Therefore, due to the limited number of encoder grades or intervals, upper harmonic components of kinematic accuracy or error may represent a very small amount of the measurement. Also, the level of accuracy of measurements for upper harmonics is not the same as for lower harmonics.

Another disadvantage of the incremental encoder method relates to the necessary adjustment of the ratio of controlled gears of a machine or mechanism. A phase meter measures only when the frequency of both canals is the same. When the incremental encoders utilize the same increment spacing and the measured gears do not, a common scale for each incremental encoder must be obtained and each encoder should be connected with its own frequency divider to obtain a complete balance of frequencies. However, even using frequency dividers some measuring information would be inevitably lost, thereby negatively affecting the resolution capability of the device. Moreover, in some instances it is impossible to establish a correct ratio between incremental encoders because the intervals on each encoder are not divisible by a common denominator and therefore a common scale cannot be found. The same difficulties would be obtained if a combination of both dividers and multipliers were used to manage the same balance problem of frequencies.

SUMMARY OF THE INVENTION

It is therefore an object of the present invention to utilize a system for measuring the accuracy of machines and mechanisms which is capable of obtaining static and dynamic modes of measurements of elements in machines and mechanisms.

It is also an object of the present invention to alleviate the problem of dividing frequencies by creating a universal method of adjusting the differences in frequencies.

It is also an object of the present invention to achieve a system for measuring the accuracy of machines and mechanisms having increased harmonic resolution capabilities, regardless of ratio combination.

The aforementioned objectives may be achieved by utilizing the apparatus and method for measuring the accuracy in machines and mechanisms using absolute encoders in accordance with the principles of the present invention. The method includes determining the absolute position of a driving member using a first absolute encoder operatively engaged to the driving member; determining the actual absolute position of a driven member using a second absolute encoder operatively engaged to the driven member; calculating a theoretical absolute position of the driven member based upon the absolute position of the driving member; and comparing the actual absolute position of the driven member to the theoretical absolute position of the driven member to determine the accuracy of the machines and mechanisms.

Calculating a theoretical absolute position of the driven member based upon the absolute position of the driving member may be performed by calculating the theoretical absolute position of the driven member using a ratio function. The ratio function may be a mathematical formula for calculating the theoretical absolute position of the driven member based upon the absolute position of the driving member.

Calculating the theoretical absolute position of the driven member based upon the absolute position of the driving member may be performed by reading the theoretical absolute position of the driven member from a data table comprising multiple theoretical absolute position listings of the driven member wherein each of the theoretical absolute position listings corresponds to an absolute position of the driving member. The data table may be stored within a memory means. The multiple theoretical absolute position listings may be previously calculated using a ratio function.

Determining the absolute position of the driving member may be performed by obtaining a binary signal, of any known kind (binary-decimal signal, Grey code signal, pseudorandom code known as a chain code signal) where a binary sequence is imprinted as a single encoded track, and any others which adequately reflect the absolute coordinates, from the first absolute encoder and converting the binary signal from the first absolute encoder to the adequate coordinate value representative of the absolute position of the driving member.

The first absolute encoder may be an absolute optical encoder as well as magnetic, opto-acoustic or any other type of absolute encoder. Also, the coordinate value may be obtained using a microprocessor.

Determining the actual absolute position of the driven member may be performed by obtaining a binary signal from the second absolute encoder and converting the binary signal from the second absolute encoder to a coordinate value representative of the absolute position of the driven member. The second absolute encoder may be an absolute optical encoder similar to those types which may be used as the first absolute encoder. Also, the coordinate value may be obtained using a microprocessor.

Calculating the theoretical absolute position of the driven member based upon the absolute position of the driving member may be performed using a microprocessor.

The method may further include calculating the ratio function, which may be performed using a microprocessor.

One of the driving member and driven member may be a rotatable member. One of the driving member and driven member may be a linearly translatable member. The theoretical absolute position of the driven member may vary non-linearly with the absolute position of the driving member.

The invention also includes an apparatus for measuring the accuracy of machines and mechanisms. The apparatus may include a first absolute encoder operatively engaged to a driving member; a second absolute encoder operatively engaged to a driven member; means for determining an actual absolute position of the driven member using a binary signal generated by the second absolute encoder; means for determining an absolute position of the driving member using a binary signal generated by the first absolute encoder; means for calculating a theoretical absolute position of the driven member based upon the absolute position of the driving member; and means for comparing the actual absolute position of the driven member with the theoretical absolute position of the driven member to determine the accuracy of the machines and mechanisms.

The apparatus may also include a means for reading the theoretical absolute position of the driven member from a data table comprising multiple theoretical absolute position listings of the driven member wherein each of the theoretical absolute position listings corresponds to an absolute position of the driving member. The data table may be stored within a memory.

The apparatus may also include a means for converting the binary signal from the first absolute encoder and converting the binary signal to a coordinate value representative of the absolute position of the driving member.

At least one of the means for determining an actual absolute position of the driven member using a binary signal generated by said second absolute encoder, the means for determining an absolute position of the driving member using a binary signal generated by said first absolute encoder, the means for calculating a theoretical absolute position the driven member based upon said absolute position of the driving member, and the means for comparing said actual absolute position of the driven member with said theoretical absolute position of the driven member to determine the accuracy of the machines and mechanisms includes a microprocessor.

BRIEF DESCRIPTION OF THE DRAWINGS

The invention may be described with reference to the detailed description of an embodiment thereof and the drawings in which.

DETAILED DESCRIPTION OF A PREFERRED EMBODIMENT

In accordance with the principles of the present invention absolute encoders are used to determine the kinematic accuracy or error in machines or mechanisms. Moreover, a computer or microprocessor should be used to process static or dynamic angular information, and to calculate an established ratio with a very high precision level. Therefore, it is possible to measure the absolute coordinates or position of the driven member and to calculate the absolute theoretical position of the driven member by processing the same using a ratio function. Thereafter, a theoretical absolute position may be compared to, e.g., subtracted from, the actual absolute position of the driven member. The difference among these values constitutes the kinematic accuracy or error. In accordance with the principles of the present invention, the measurements are possible in the static mode of machine. Moreover, there are no theoretical obstacles for measuring kinematic accuracy or error in the static mode.

In accordance with the present invention, the measurement of kinematic accuracy or error may be performed in machines that have several input-output (or driving and driven) members or elements. In this situation, for example, several encoders may be used, and one encoder may be operatively engaged to each element in the machine or mechanism. Moreover, rotary or linear encoders may be used to measure the corresponding movement. Also, in accordance with the present invention, it is possible to provide measurements of kinematic accuracy or error in mechanisms, such as a cam and follower, with no linear relationship between the driving and driven elements of machines. The relationship between the position of the driving element and the position of the driven element may be presented by a ratio function Z(Ai(t)). In non-circular gears or cams the ratio function will be nonlinear. Also certain mechanisms which may have driving and driven elements with interrupted cycles of movement could also be represented by a specific ratio function. Furthermore, a ratio function may represent the driving element's position as a function of time, or more specifically, the time that the driving element is moving, and as a function of the position of the driving element. In this situation, the accumulation of the kinematic accuracy or error after one period may be measured. Alternatively, after one period of the driving element, position measurements may begin anew and previous period kinematic accuracy or error may be eliminated automatically.

The particular ratio function and measurement process depends essentially on the conditions where the device will be applied. In some cases, it may not be necessary to provide measurements in real time. Raw data could be reserved in computer memory and then, afterwards this information may be withdrawn and processed in the proper way. However, in situations it may be necessary to process received information in real time. These situations usually require high speed hardware and exclude the application of complicated algorithms for information processing. Some of these algorithms require significant time for data processing and as a result their application may not allow real time measurements of kinematic accuracy or error.

Figure 1:
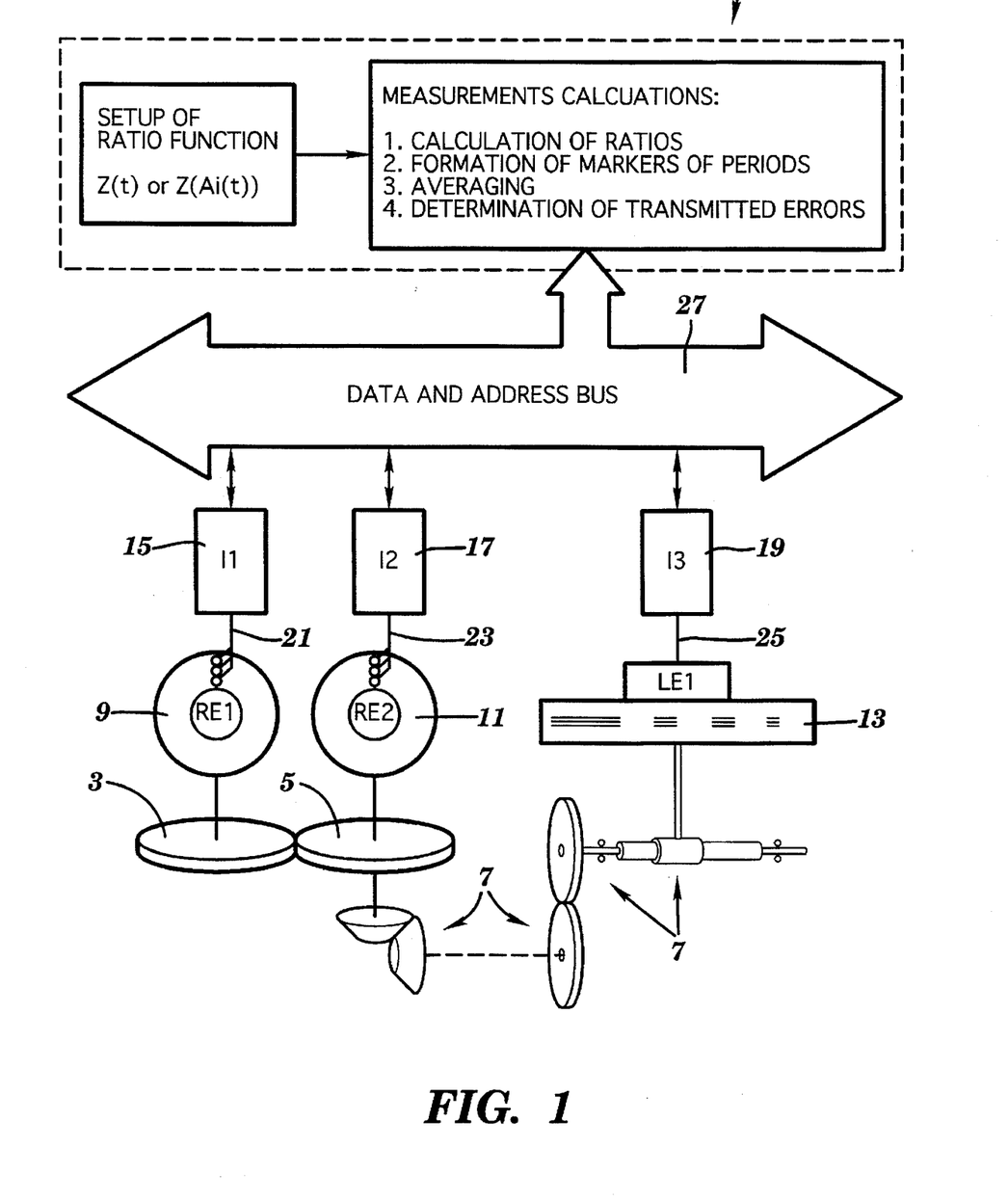
FIG. 1 depicts a schematic representation of the apparatus for measuring the accuracy in a machines and mechanisms using absolute encoders constructed in accordance with the present invention wherein the mechanism contains multiple members or elements therein.

Referring to FIG. 1, one embodiment of the apparatus constructed in accordance with the principles of the present invention is described. A machines and mechanisms 1 may contain a plurality of elements or members 3, 5, 7 therein. In this example, members 3 and 5 constitute gears and member 7 constitutes a rack where the gears 3, 5 and rack 7 are operatively engaged. For purposes of clarity, gear 3 will be referred to as the driving member while gear 5 will be referred to as the driven member and the accuracy of the machines and mechanisms and measurements thereof will be described with reference to gears 3 and 5. However, it will be apparent to one of ordinary skill in the art that gear 5 may also be considered a driving member while rack 7 be considered as a driven member and the principles of the present invention apply equally with any combination of driving and driven members within a mechanism.

A first absolute encoder 9 may be operatively engaged to the driving member 3 or driving gear 3 in a manner which is well known to those of ordinary skill in the art. A second optical encoder 11 may be operatively engaged to the driven member or driven gear 5 also in the same manner known to persons of ordinary skill in the art. Also, a third optical encoder 13 may be operatively engaged to the rack 7 thereby operating as a linear optical encoder, as opposed to the first and second optical encoders which operate as rotary optical encoders, also in a manner well known to those of ordinary skill in the art. Each of the optical encoders 9, 11 and 13 are absolute optical encoders capable of generating a binary word unique to a particular position of the optical encoder disk or tracks position as is more fully described herein below. However, it will be apparent to one of ordinary skill in the art that the invention is not limited to optical encoders but other types of absolute encoders may be used in accordance with the principles of the present invention.

Each of the first absolute encoder 9, the second absolute encoder 11 and third absolute encoder 13 may be operatively coupled or engaged to a corresponding interpolation block 15, 17, 19, as is shown in FIG. 1. The first interpolation block 15 may be coupled to the first absolute encoder 9 while the second interpolation block 17 may be operatively coupled to the second absolute encoder 11, and the third interpolation block 19 coupled to the third absolute encoder 13. As is apparent to one of ordinary skill in the art interpolation blocks 15, 17, and 19 may be coupled to their corresponding absolute encoders by appropriate signal transmission means, e.g., wiring 21, 23, 25. Each of the interpolation blocks 15, 17, 19 may be coupled to a data and address bus 27 which operates to store and/or transfer data to a computer or microprocessor 29.

Figure 2:
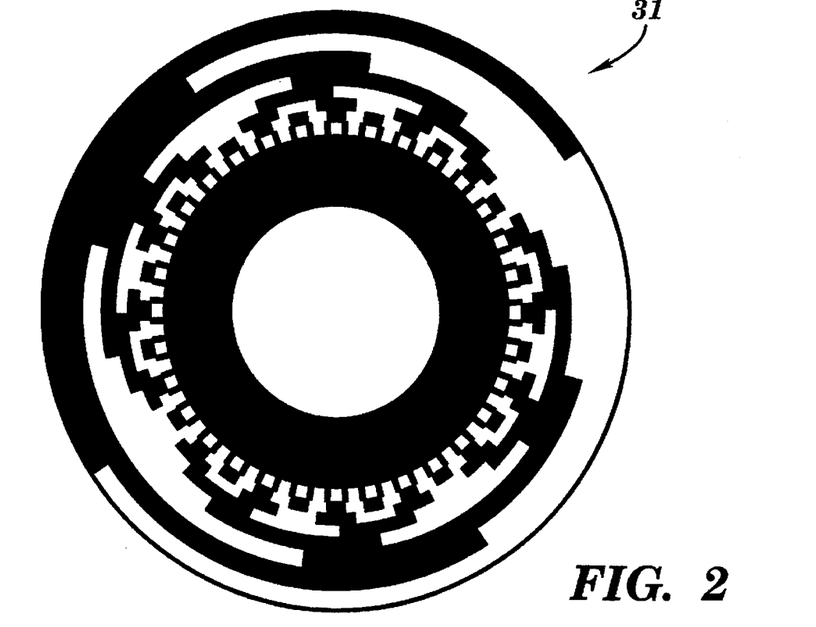
FIG. 2 depicts an optical absolute encoder disk useable in an absolute optical encoder which is useable in the apparatus and method for measuring the accuracy in machines and mechanisms constructed in accordance with the principles of the present invention.

Using such a configuration as shown in FIG. 2, the optical encoders 9, 11 and 13 are coupled to microprocessor 29 which is capable of processing the data generated by the optical absolute encoders in order to perform the method of measuring the accuracy in the machines and mechanisms 1 in accordance with the present invention. As will be readily apparent to one of ordinary skill in the art, additional interpolation blocks and/or absolute encoders of the optical or other type may be coupled to the data and address bus depending upon the configuration of the machines and mechanisms 1 and the number of elements or members therein. As referred to herein, members refers to an element within the machines and mechanisms which is used to transfer power from an input of a mechanism to an output of a mechanism or to transfer the movement of an input of a mechanism to an output of a mechanism. Examples of members of a mechanism include the gears within gear trains as well as the gears and/or shafts of differentials. However, other types of members exist.

Referring to FIG. 2, an example of an absolute encoder disk useable within the rotary optical absolute encoders 9, 11 is shown. The optical absolute encoder disk 31 contains eight tracks thereon. Each track located along a different radius of the disk. The eight track absolute encoder disk 31 is capable of generating an eight bit binary word constituting 256 counts. Each count being representative of a particular word corresponding to a unique position of the absolute encoder disk as it rotates in conjunction with the rotation of the gear 3 or 5 which it is operatively engaged thereto. Use of absolute optical encoders to generate a binary code in the form of a gray, natural binary and/or binary coded decimal signal as well as pseudorandom code known as a chain code signal are well known in the art.

Figure 3:
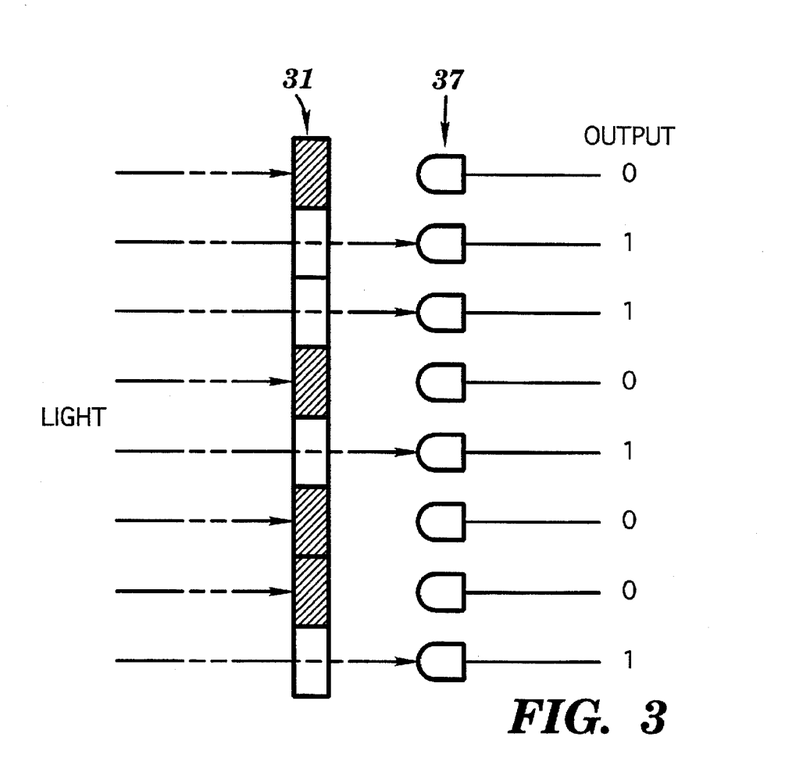
FIG. 3 depicts a schematic representation of one type of optical absolute encoder useable in accordance with the principles of the present invention.

Referring to FIGS. 2 and 3, light that is transmitted through the disk 31 strikes photodetectors 37 which convert the light pattern into electrical signals. If the code track at a given position is transparent the bit is on and the output is a binary 1. If the code track at a given position is opaque, light is not detected by the photodetector and the output is a binary Ø. The absolute encoder therefore generates a digital word by optically reading a radial line of the code disk. The eight track optical encoder depicted in FIG. 2 is capable of a resolution of eight bits which generates 256 different binary words each unique of a particular rotational position of the optical encoder disk 31 and therefore the rotatable element it is operatively engaged thereto. The encoder disk 31 is a main part of an absolute encoder, such as, for example, the model 25/04 or 60/25H manufactured by Gurley Precision Instruments of Troy, N.Y., U.S.A., which is suggested for use in the present invention.

As it is well known to those of ordinary skill in the art, the interpolation blocks 15, 17 and 19 are used to interpolate, and in this case, the outputs generated by the photodetectors within the optical absolute encoder, to convert the type of code generated to either Gray, natural binary or binary coded decimal outputs, and to provide the correct interface during the interrogation.

Figure 4:
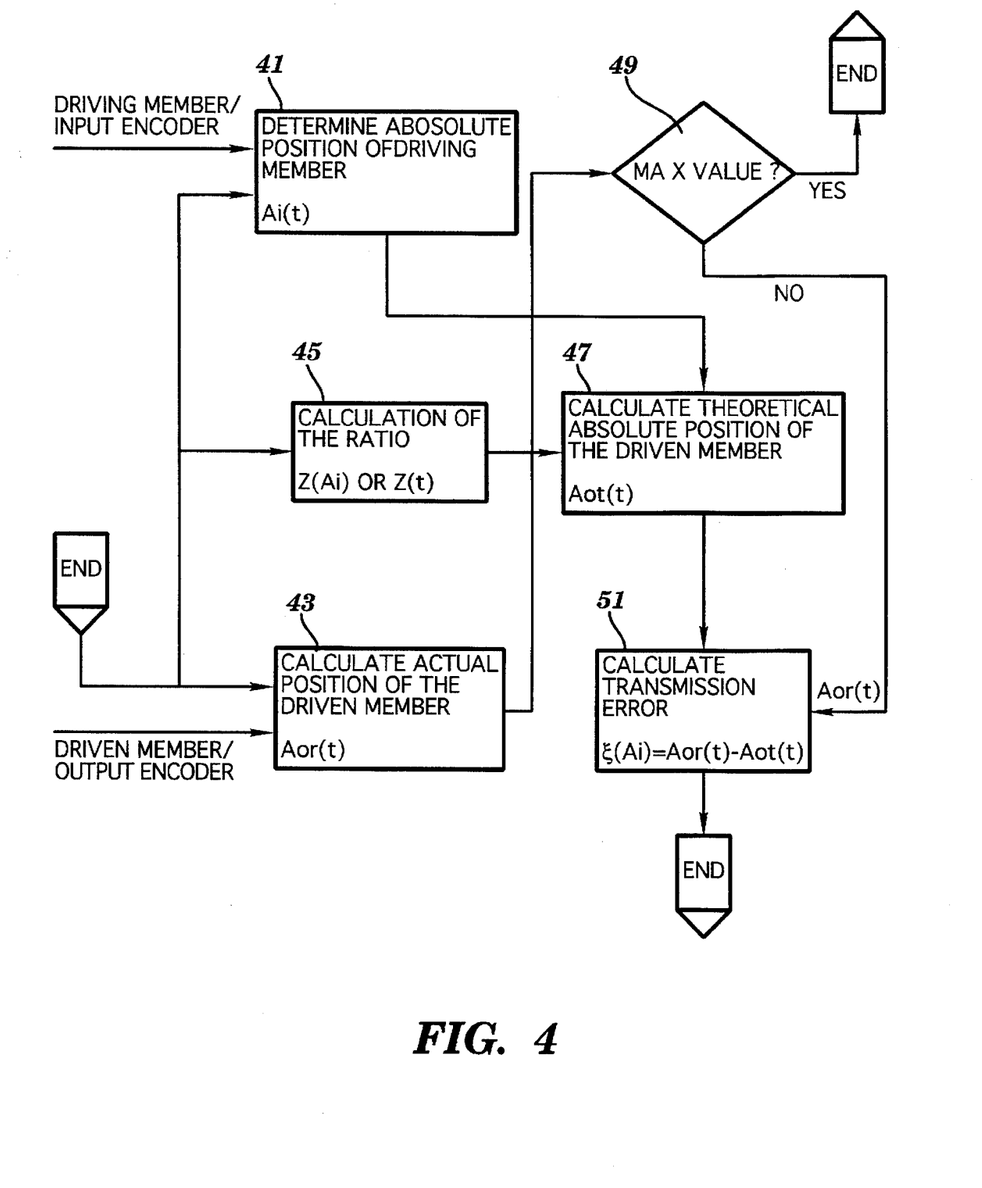
FIG. 4 depicts a flow diagram useful in evaluating the method for measuring the accuracy in machines and mechanisms using absolute encoders in accordance with the principles of the present invention.

Referring to FIG. 4, the steps performed by the apparatus as described in reference to FIG. 1 will now be described. In a first step 41, the input from the first absolute encoder 9 and interpolation block 15 is processed by the microprocessor 29 which calculates the absolute position of the driving member or gear 3 operatively engaged to the first absolute encoder 9. The position of the driving member 3 may be described in terms of angular coordinates and referred to as Ai(t). Similarly, in the step 43 the actual absolute position of the driven member 5 is calculated by the microprocessor 29 by data generated by the second absolute optical encoder 11 and/or interpolation block 17. The actual absolute position of the driven member may be described as Aor(t). If not previously given, known, determined or calculated, the ratio function may be calculated in the step 45. The ratio function, e.g., z(Ai) or z(t) represents the relationship of the theoretical position of the driven member 5 based upon the position of the driving member 3. The position may be based on either coordinates such as angular coordinates or time. The ratio function will, of course, vary based upon the configuration and relationship between the driving and driven member and need not be limited to linear functions. Therefore, the invention may be used in power transmissions mechanisms having members with non-linear output members such as cam and follower. The ratio function may be calculated by the microprocessor 29 if not previously determined and stored in memory.

In another step 47, the theoretical absolute position of the driven member, Aot(t) may be calculated by the microprocessor 29 based upon the absolute position of the driving member calculated or determined by the microprocessor 29 based upon the data generated by the first optical encoder 9. The theoretical absolute position of the driven member 5 is calculated by processing the absolute position of the driving member 3 in accordance with the particular ratio function describing the relationship between the driving member 3 and driven member 5. In step 49, if the actual absolute position of the driven member is greater than a maximum value, for example, a full period position, and the accumulation of kinematic accuracy or error for positions of greater than one period of movement is not desired, then further processing is ceased. The first and second absolute optical encoders 9, 11 are then used to determine the new positions of the driven and driving members 3, 5. If the actual absolute position of the driven member 5 is below the maximum value, then the microprocessor 29, in step 51, determines the accuracy of the machines and mechanisms by comparing the actual absolute position of the driven member to the theoretical absolute position of the driven member, preferably by subtraction between the two. The resultant value, therefore, represents the kinematic accuracy or error between the driving element 3 and driven element 5, which can later be reported by some suitable means.

As will be apparent to one of ordinary skill in the art, the identical process as previously described may be used when multiple elements such as rack 7, which may be designated as the driven element and gear 5 designated as the driving element. Using the aforementioned process, the kinematic accuracy or error of machines and mechanisms having an infinite number of elements therein may be calculated.

Figure 5:
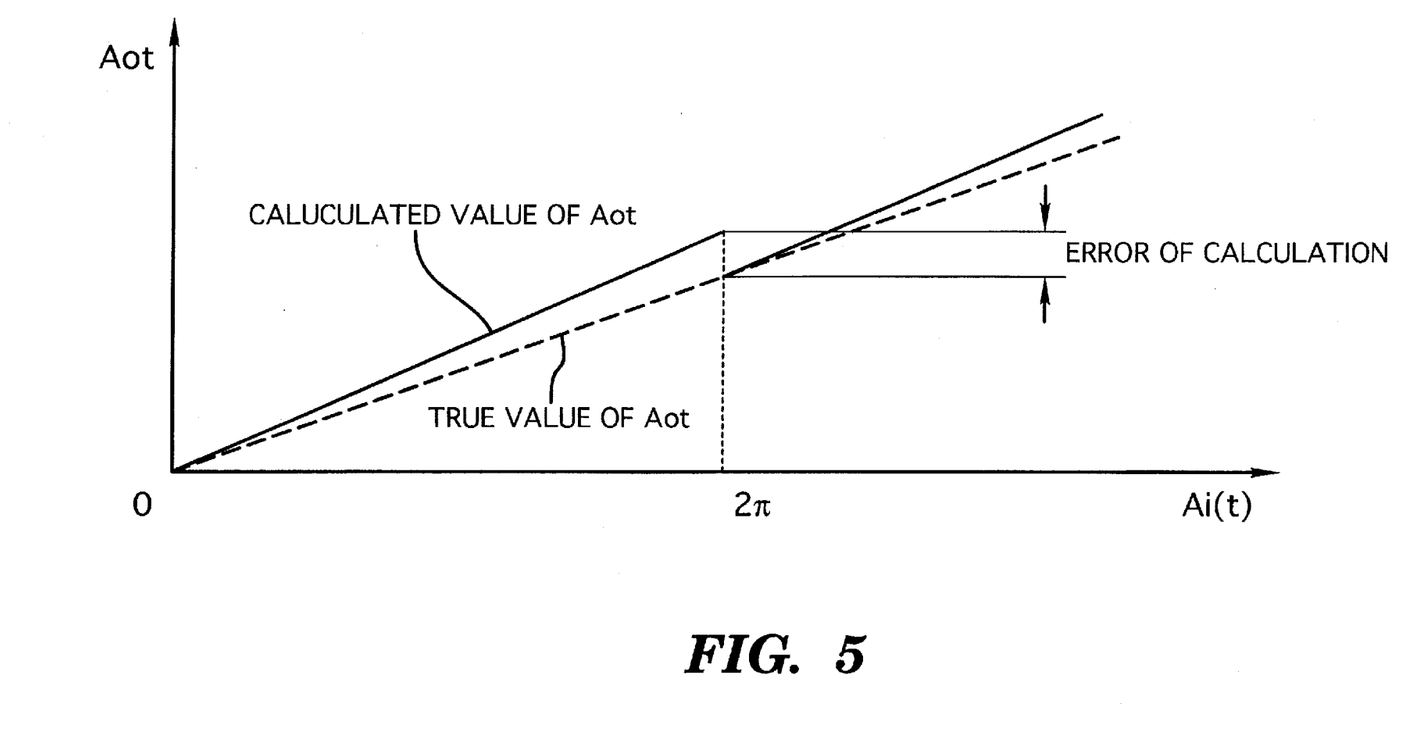
FIG. 5 depicts a graphical representation of the theoretical absolute position of a driven member in machines and mechanisms as well as the actual absolute position of the driven member within the same machines and mechanisms and the calculation of error therebetween along with the reset of any accumulated error after one period.

Referring to FIG. 5, a schematic representation of the theoretical absolute position and the actual absolute position of the driven members as a function of the position of the driving member, represented in terms of angular coordinates, may be depicted whereby the accumulation of transmission is undesired for rotation of the driving member 3 of more than a period, i.e., 2π. At positions of greater than 2π, the process may be reset and the kinematic accuracy or error set to zero and recalculated.

In order to minimize actual processing by the microprocessor 29 during operation of the machines and mechanisms 1 calculation of the theoretical absolute position of the driven member in step 47 may be performed by reading the theoretical absolute position of the driven member from a data table stored within memory. The data table may comprise a listing of multiple theoretical absolute positions values of the driven member. Each theoretical absolute position listing or value corresponding to an absolute position of the driving member. In this technique, the data representative of the absolute position of the driving member may be read and the corresponding theoretical absolute position listing of the driven member retrieved from memory in order to calculate the kinematic accuracy or error in step 51.

Although the invention has been described with reference to the embodiments depicted herein, it will be apparent to one of ordinary skill in the art that various modifications and substitutions may be made to the aforementioned embodiments without departing in any way from the scope of the invention as defined by the following claims.

What is claimed is:

1. A method for measuring the accuracy of machines and mechanisms having driving member and a driven member comprising the steps of:

(a) determining the absolute position of the driving member using a first absolute encoder operatively engaged to the driving member;

(b) determining the actual absolute position of the driven member using a second absolute encoder operatively engaged to the driven member;

(c) calculating a theoretical absolute position of the driven member based upon the absolute position of the driving member; and (d) comparing the actual absolute position of the driven member to the theoretical absolute position of the driven member to determine the accuracy of the machines and mechanisms.

2. The method of claim 1 wherein calculating a theoretical absolute position of the driven member based upon the absolute position of the driving member comprises calculating the theoretical absolute position of the driven member using a ratio function.

3. The method of claim 2 wherein the ratio function comprises a mathematical formula for calculating the theoretical absolute position of the driven member based upon the absolute position of the driving member.

4. The method of claim 1 wherein calculating the theoretical absolute position of the driven member based upon the absolute position of the driving member comprises reading the theoretical absolute position of the driven member from a data table comprising multiple theoretical absolute position listings of the driven member wherein each of said theoretical absolute position listings corresponds to an absolute position of the driving member.

5. The method of claim 4 wherein said data table is stored within a memory.

6. The method of claim 5 wherein said multiple theoretical absolute position listings are previously calculated using a ratio function.

7. The method of claim 1 wherein determining the absolute position of the driving member using a first absolute encoder operatively engaged to the driving member comprises obtaining a binary signal from said first absolute encoder and converting said binary signal from said first absolute encoder to a coordinate value representative of said absolute position of the driving member.

8. The method of claim 7 wherein said first absolute encoder comprises an absolute optical encoder.

9. The method of claim 8 wherein said coordinate value is obtained using a microprocessor.

10. The method of claim 1 wherein determining the actual absolute position of the driven member using a second absolute encoder operatively engaged to the driven member comprises obtain a binary signal from said second absolute encoder and converting said binary signal from said second absolute encoder to a coordinate value representative of said absolute position of the driving member.

11. The method of claim 10 wherein said second absolute encoder comprises an absolute optical encoder.

12. The method of claim 11 wherein said coordinate value is obtained using a microprocessor.

13. The method of claim 1 wherein calculating the theoretical absolute position of the driven member based upon the absolute position of the driving member is performed using a microprocessor.

14. The method of claim 2 further comprising calculating the ratio function.

15. The method of claim 1 wherein at least one of steps (a), (b), (c) and (d) are performed using a microprocessor.

16. The method of claim 1 wherein at least one of said driving member and driven member comprises a rotatable member.

17. The method of claim 1 wherein one of said driving member and driven member comprises a linearly translatable member.

18. The method of claim 1 wherein the theoretical absolute position of the driven member varies non-linearly with the absolute position of the driving member.

19. An apparatus for measuring the accuracy of a machines and mechanisms having a driving member and a driven member comprising:

a first absolute encoder operatively engaged to a driving member;

a second absolute encoder operatively engaged to a driven member;

means for determining an actual absolute position of the driven member using a binary signal generated by said second absolute encoder;

means for determining an absolute position of the driving member using a binary signal generated by said first absolute encoder;

means for calculating a theoretical absolute position of the driven member based upon said absolute position of the driving member; and means for comparing said actual absolute position of the driven member with said theoretical absolute position of the driven member to determine the accuracy of the machines and mechanisms.

20. The apparatus of claim 19 wherein said means for calculating a theoretical absolute position of the driven member based upon the absolute position of the driven member uses a ratio function.

21. The apparatus of claim 20 wherein the ratio function comprises a mathematical formula for calculating the theoretical position of the driven member based upon the absolute position of the driving member.

22. The apparatus of claim 20 further comprising a means for reading the theoretical absolute position of the driven member from a data table comprising multiple theoretical absolute position listings of the driven member wherein each of said theoretical absolute position listings corresponds to an absolute position of the driving member.

23. The apparatus of claim 22 wherein said data table is stored within a memory.

24. The apparatus of claim 23 further comprising a means for carrying said binary signal from said first absolute encoder.

25. The apparatus of claim 24 further comprising a means for converting said binary signal from said first absolute encoder and converting said binary signal to a coordinate value representative of the absolute position of the driving member.

26. The apparatus of claim 19 wherein said first absolute encoder comprises an absolute optical encoder.

27. The apparatus of claim 19 wherein said second absolute encoder comprises an absolute optical encoder.

28. The apparatus of claim 19 wherein at least one of said driving member and driven member comprises a rotatable member.

29. The apparatus of claim 19 wherein one of said driving member and driven member comprises a linearly translatable member.

30. The apparatus of claim 19 wherein the theoretical absolute position of the driving member varies non-linearly with the absolute position of the driving member.

31. The apparatus of claim 19 wherein at least one of said means for determining an actual absolute position of the driven member using a binary signal generated by said second absolute encoder, said means for determining an absolute position of the driving member using a binary signal generated by said first absolute encoder, said means for calculating a theoretical absolute position the driven member based upon said absolute position of the driving member, and said means for comparing said actual absolute position of the driven member with said theoretical absolute position of the driven member to determine the accuracy of the machines and mechanisms comprises a microprocessor.

* * * * *